United States Patent Office 3,368,956
Patented Feb. 13, 1968

3,368,956
SYNTHESIS OF AMMONIA FROM NITROGEN
AND HYDROGEN
George C. Yeh, Willistown Township, Chester County, Pa.
(Smedley Drive, R.D. 1, Newtown Square, Pa. 19073)
No Drawing. Continuation-in-part of application Ser. No.
413,312, Nov. 23, 1964. This application June 14, 1967,
Ser. No. 646,427
The portion of the term of the patent subsequent to
Sept. 26, 1984, has been disclaimed
4 Claims. (Cl. 204—177)

ABSTRACT OF THE DISCLOSURE

A process involving impressing an electrostatic charge on a catalyst and passing nitrogen and hydrogen in contact with the catalyst to produce ammonia.

This application is a continuation-in-part of my previous application Ser. No. 413,312, filed Nov. 23, 1964, now Patent No. 3,344,052 of Sept. 26, 1967, for the method of producing ammonia including contacting an electrostatically charged catalyst with nitrogen and hydrogen.

In my previous application, now Patent No. 3,344,052 of Sept. 26, 1967, mentioned above, it has been shown, with Example 3, that the conversion efficiencies of ammonia synthesis processes can be improved by contacting nitrogen and hydrogen gases with a bed of regular, singly promoted iron catalyst ($Fe-Al_2O_3$) which is biased with a negative electric potential or with an alternating current including both negative and positive potentials sufficient to provide an electrostatic charge. It was also demonstrated, with Example 4 of said patent, that a similar improvement on the conversion efficiency can also be obtained when nitrogen gas was subjected to a positive electrostatic field prior to mix with hydrogen gas and contact with the said catalyst bed which was electrostatically charged with a negative potential. In these examples shown, the improvement on the conversion efficiency brought up by the application of a positive electrostatic charge to the said catalyst was observed only when a positive potential was applied intermittantly (see Example 3 of said patent—Runs No. 74–76 and No. 87–91). No appreciable effect was observed on the conversion efficiency when only a positive potential was applied continuously to the said catalyst (see Example 3 of said patent—Runs No. 48–51).

In the following two examples, it will be shown that a similar improvement on the conversion efficiency can also be obtained by the continuous application of a positive electrostatic charge to a bed of catalyst at a higher temperature level.

Example 1

In this experiment, a flow reactor having the design identical to that used in the above-mentioned Examples 3 and 4 of said patent, but made of quartz, was used. A doubled promoted iron catalyst ($Fe-Al_2O_3-K_2O$) was packed in a bed whose depth can be varied within the said reactor. The reactant gases were preheated separately to a temperature around 680° C. and then fed into the reactor at the same rates and with the same mole-ratio and in the exact same manner as described in the above-mentioned Example 4. The temperature inside the reactor was kept constant at 680°±1° C. by external heating as was down in the other experiments. In addition to the differences in the reaction temperature and in the catalyst type, as compared to the above-mentioned Example 4, the polarities of electrostatic charges applied to nitrogen gas and to the said catalyst were reversed; nitrogen was subjected to a negative electrostatic field (−3,500) prior to contact with the said catalyst, which was charged with a continuous positive potential (+3,500).

After a steady-state has been reached, samples were taken from the leaving product gases stream and the contents of the ammonia formed were then analyzed following the same procedure as in the above-mentioned Examples 3 and 4. The conversion efficiency obtained was 0.710 with good reproducibility. In order to determine the effect of the electrostatic charges applied, an identical run was carried out with no potentials applied to either the gases or the said catalyst and the conversion efficiency was found to be 0.525. While no immediate simple explanation could be given to this observed effect it was thought useful to carry out further study to observe more closely the possible complex interaction of electrostatic charges and catalyst types at high temperature levels.

Example 2

In this experiment, the reactor, catalyst, pressure, temperature and hydrogen-nitrogen mole ratio were identical to those used in Example 1. But, the hydrogen and nitrogen gases were fed into said reactor from one end of the reactor and mixed immediately before contacting with said catalyst and then leaving from the other end of said reactor. A constant space velocity of 500 $cm.^3$ (NTP) per $cm.^3$ catalyst per minute was used, and, as done in Example 1 of this application, both gases were preheated separately before being fed into the said reactor. None of these two gases was subjected to an electrostatic field prior to contact with said catalyst but said catalyst was biased with either a negative or positive potential of various voltages to provide an electrostatic charge. Sampling and analysis of the products were carried out by following the same procedure and methods used in Example 1. This experiment corresponds to Example 3 set forth in my previously-mentioned patent, although the catalyst in the present experiment was a doubly promoted iron catalyst instead of a singly promoted iron catalyst as used in the previously-mentioned patent, and the temperature used in the present experiment was higher at 680°±1° C. instead of a lower temperature of 400°±1° C. as employed in the previously-mentioned patent.

Altogether seventeen experimental runs were made and the results of ten representative runs are shown in the following:

RESULTS

| Run No. | Electrostatic Charges Applied | Conv. Effic. | Increase in Conv. Effic. |
|---|---|---|---|
| 1 | (¹) | 0.522 | |
| 1A | (¹) | 0.527 | |
| 2 | −35,000 | 0.960 | 0.435 |
| 5 | −10,200 | 0.873 | 0.348 |
| 7 | −25,000 | 0.944 | 0.419 |
| 10 | +45,300 | 0.758 | 0.233 |
| 12 | +25,500 | 0.722 | 0.197 |
| 14 | +54,000 | 0.761 | 0.236 |
| 15 | +15,000 | 0.720 | 0.195 |
| 17 | +3,500 | 0.705 | 0.180 |

¹ Electrically neutral.

From the above results, it may be seen that the improvement on the conversion efficiency brought up by the application of a negative electrostatic charge to the doubly promoted iron catalyst at a temperature of 680° ±1° C. is quite remarkable, and the similar improvement caused by a positive electrostatic charge applied to the same catalyst at the temperature is not as significant but still very much pronounced. It is out of the scope of this description to attempt to theorize any possible complex interactions between the reacting species and the said catalysts at high temperature levels especially when the electrostatic activating techniques as used in this invention are applied to said catalysts. But, it may be safe to simply state that some elementary processes taking place on the surface of the catalyst during the reaction appear to behave differently, depending upon the promoters used in preparing the catalyst and on the temperature level at which said reaction takes place.

Having thus further clarified the description of my invention, as originally disclosed in my previous application, Ser. No. 413,312, now Patent No. 3,344,052, what I claim as new and desire to secure by Letters Patent is:

1. In a method of synthesizing ammonia from a gaseous stream predominantly of nitrogen and hydrogen including heating a mixture of said gases and bringing said stream into intimate contact with a bed of catalyst for effecting interaction between said nitrogen and hydrogen to produce ammonia, the improvement wherein said catalyst is biased with a positive electric potential sufficient to provide an electrostatic charge but insufficient to cause an electrical discharge.

2. The method of claim 1 wherein at least one of said gases is subjected to an electrostatic field prior to contact with said catalyst bed.

3. The method of claim 1 wherein the positive potential is applied with a continuous direct current.

4. The method of claim 1 wherein the positive potential is applied with an intermittent direct current.

References Cited

P. M. Stadnick et al., Kinetika i Kataliz, volume 5, No. 3, May-June 1964, pp. 430–433.

ROBERT K. MIHALEK, *Primary Examiner.*